(12) United States Patent
Raines et al.

(10) Patent No.: US 9,193,325 B2
(45) Date of Patent: Nov. 24, 2015

(54) ACTIVE BOLSTER WITH IN-MOLD ASSEMBLY OF BLADDER AND TRIM PANEL

(71) Applicant: FORD GLOBAL TECHNOLOGIES, LLC, Dearborn, MI (US)

(72) Inventors: Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 25 days.

(21) Appl. No.: 14/074,068

(22) Filed: Nov. 7, 2013

(65) Prior Publication Data

US 2015/0123386 A1    May 7, 2015

(51) Int. Cl.
*B60R 21/231*    (2011.01)
*B60R 21/02*    (2006.01)
*B60R 21/00*    (2006.01)

(52) U.S. Cl.
CPC ............... *B60R 21/231* (2013.01); *B60R 21/02* (2013.01); *B60R 2021/0051* (2013.01); *B60R 2021/0273* (2013.01)

(58) Field of Classification Search
CPC ............ B60R 21/231; B60R 2021/047; B60R 2021/0051; B60R 2021/0053; B60R 21/02; B60R 2021/0273
See application file for complete search history.

(56) References Cited

U.S. PATENT DOCUMENTS

| | | | |
|---|---|---|---|
| 6,758,493 B2 * | 7/2004 | Conlee et al. | 280/753 |
| 7,778,754 B2 | 8/2010 | Kong | |
| 8,047,561 B2 | 11/2011 | Kraus et al. | |
| 8,205,909 B2 | 6/2012 | Kalisz | |
| 8,240,703 B2 | 8/2012 | Yeon et al. | |
| 8,308,186 B1 * | 11/2012 | Orlowsky et al. | 280/728.2 |
| 8,328,230 B1 * | 12/2012 | Kalisz | 280/730.1 |
| 8,336,908 B1 | 12/2012 | Kalisz et al. | |
| 8,336,910 B1 * | 12/2012 | Kalisz et al. | 280/730.1 |
| 8,448,980 B1 * | 5/2013 | Kalisz | 280/730.1 |
| 8,454,054 B1 * | 6/2013 | Raines | 280/753 |
| 8,474,868 B2 | 7/2013 | Kalisz et al. | |
| 8,491,008 B2 * | 7/2013 | Roychoudhury et al. | 280/752 |
| 8,544,878 B1 * | 10/2013 | Kalisz et al. | 280/730.1 |
| 8,720,948 B2 * | 5/2014 | Raines et al. | 280/752 |
| 2011/0198827 A1 * | 8/2011 | Roychoudhury | 280/730.2 |
| 2011/0272926 A1 * | 11/2011 | Roychoudhury et al. | 280/728.2 |
| 2012/0112439 A1 * | 5/2012 | Roychoudhury | 280/728.3 |
| 2012/0267878 A1 * | 10/2012 | Kalisz et al. | 280/728.2 |

* cited by examiner

*Primary Examiner* — Paul N Dickson
*Assistant Examiner* — Timothy Wilhelm
(74) *Attorney, Agent, or Firm* — Vichit Chea; MacMillan, Sobanski & Todd, LLC (57) ABSTRACT

An active bolster for an interior trim surface of an automotive vehicle has a plastic-molded outer trim panel with a closed-loop bonding section on an inside surface. A plastic-molded expandable bladder member has a central attachment section configured to attach to a support structure of the vehicle, a bonding flange along an peripheral edge, and a baffle section between the central attachment section and the bonding flange. The closed-loop bonding section and the bonding flange are configured to define a substantially closed toroidal region therebetween. An attachment body is molded in-situ to substantially fill the toroidal region. As a result of the in-situ molding of the attachment body in the toroidal region, the trim panel and bladder member become bonded via the attachment body resulting in a high bonding strength.

16 Claims, 7 Drawing Sheets

ACTIVE BOLSTER WITH IN-MOLD ASSEMBLY OF BLADDER AND TRIM PANEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of the inner wall which is received by a generally planar surface of the outer wall. The outer wall and/or inner surfaces may also include upstanding sealing ribs that increase the weld strength by penetrating and fusing with the welding flange or other opposing surface during the hot welding process in which the areas to be welded are heated and then compressed. Despite the penetration of the sealing ribs, weld separation has continued to be a potential failure mode for active bolsters.

The performance of a welded joint can be affected by several variables including warping of the parts to be welded, uneven thickness of the parts, and insufficient temperature or pressure obtained during the welding process. The need to better control these variables results in increased manufacturing costs.

Various stresses during inflation can contribute to the possibility of weld failure. Due to the elasticity required for making the pleated bladder wall inflatable, a significant peel stress is experienced in some weld seam designs during expansion. A welded plastic joint general exhibits a greater strength in shear than in peel. It would be desirable to take advantage of the greater shear strength in order to reduce the likelihood of a joint failure.

SUMMARY OF THE INVENTION

In one aspect of the invention, an active bolster is provided for an interior trim surface of an automotive vehicle. A plastic-molded outer trim panel has a closed-loop bonding section on an inside surface. A plastic-molded expandable bladder member has a central attachment section configured to attach to a support structure of the vehicle, a bonding flange along an peripheral edge, and a baffle section between the central attachment section and the bonding flange. The closed-loop bonding section and the bonding flange are configured to define a substantially closed toroidal region therebetween. An attachment body is molded in-situ to substantially fill the toroidal region. An inflator couples an inflation gas into a space between the trim panel and bladder member to expand the bladder member in response to a crash event of the vehicle. As a result of the in-situ molding of the attachment body in the toroidal region, the trim panel and bladder member become bonded via the attachment body resulting in a high bonding strength.

DETAILED DESCRIPTION OF PREFERRED EMBODIMENTS

Figure 1:
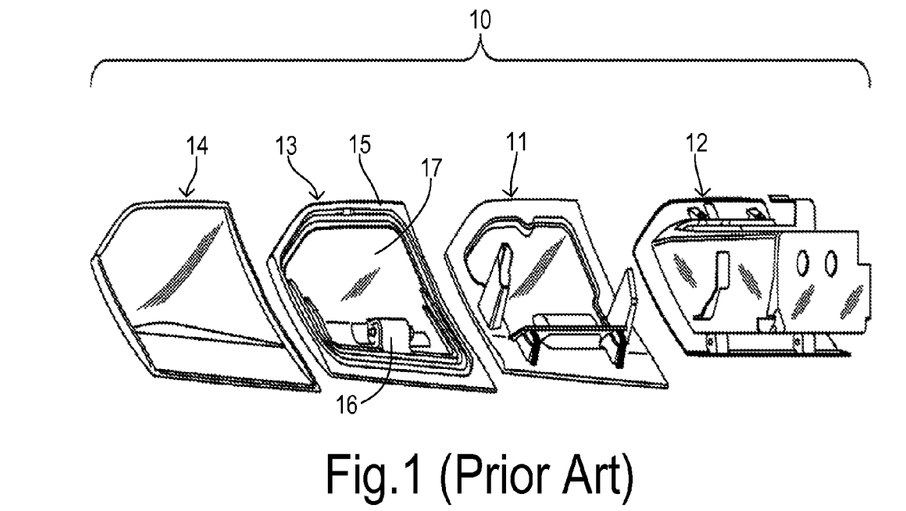
FIG. 1 is an outward-looking, exploded perspective view of a prior art active knee bolster glove box door system of a type to which the present invention can be applied.

Referring now to FIG. 1, a prior art active knee bolster system 10 has a base panel component 11 which forms the support structure or foundation for the bolster. Base 11 may be part of a glove box door which is attached to the vehicle by hinging from a storage cavity or glove box 12 as shown in FIG. 1. Alternatively, the active bolster can be mounted to another support structure such as an instrument panel support below a steering column, for example. Such locations interface to the knees of an individual riding in a corresponding seating position within a vehicle. The bolster may also be placed for protecting other body areas, such as a bolster mounted on a passenger door for torso protection.

Base 11 acts as a reaction surface for supporting an inflatable bladder formed by an inner wall (bladder member) 13 and an outer (trim panel) wall 14 that are joined around their periphery 15. Walls 13 and 14 are preferably comprised of molded plastics (such as thermoplastic polyolefin (TPO)) and are joined by plastic welding, such as hot plate welding, to form a peripheral seal around a central region 17 for forming a bladder. An inflation gas source (i.e., inflator) 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
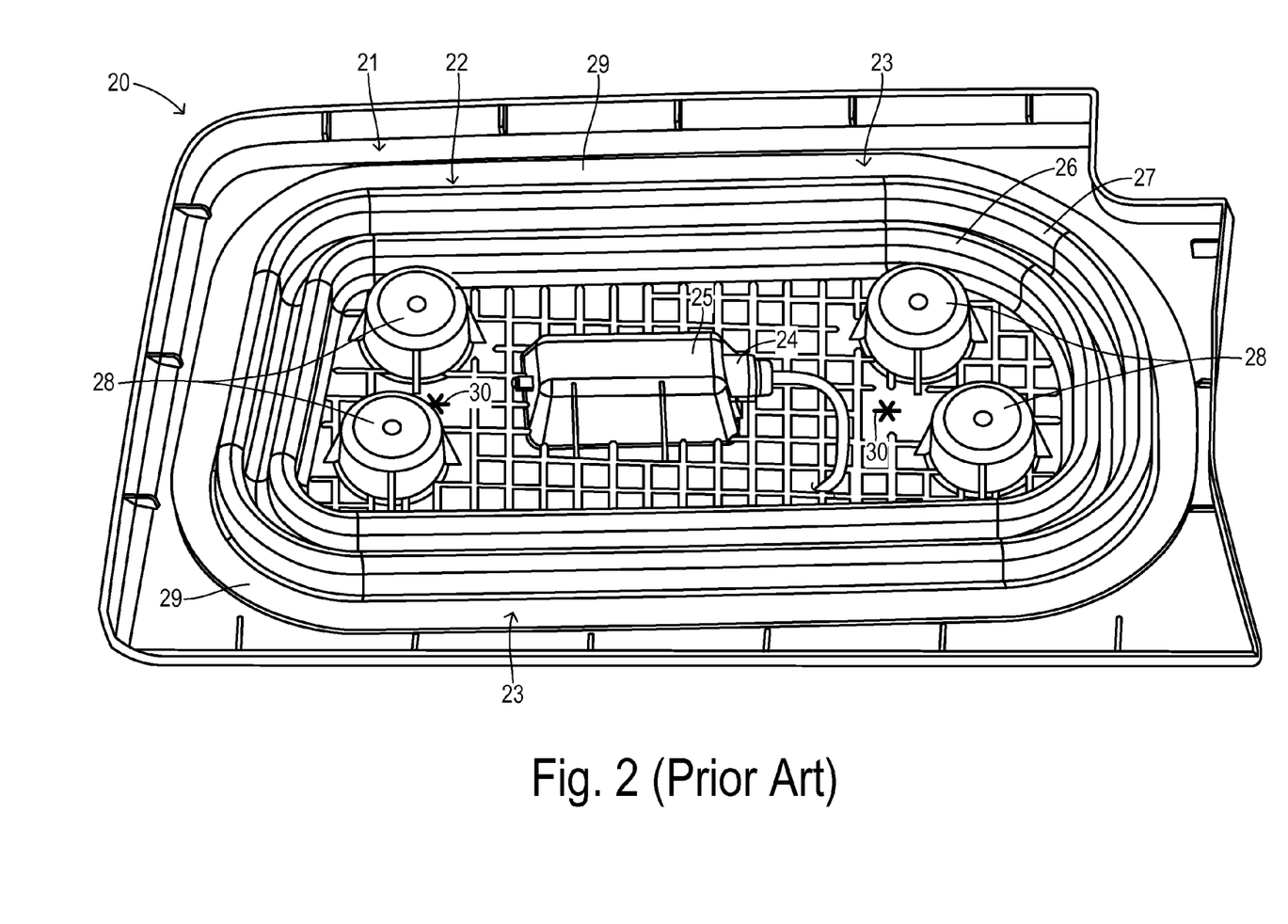
FIG. 2 is a rear perspective view of an outer trim panel and bladder wall assembly of a prior art active bolster.

FIG. 2 is a rear view of another prior art embodiment of an inflatable bladder 20. A plastic-molded outer trim panel wall 21 overlies a plastic-molded, expandable inner bladder wall 22. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of bladder wall 22 during inflation. A plurality of bosses 28 are used to mount bladder wall 22 to a vehicle support structure acting as a reaction surface. A welding flange 29 extends circumferentially around bladder wall 22. Vent holes 30 comprised of an asterisk-shaped pattern cut through bladder wall 22 may be included for venting the central volume prior to and during deployment.

Figure 3:
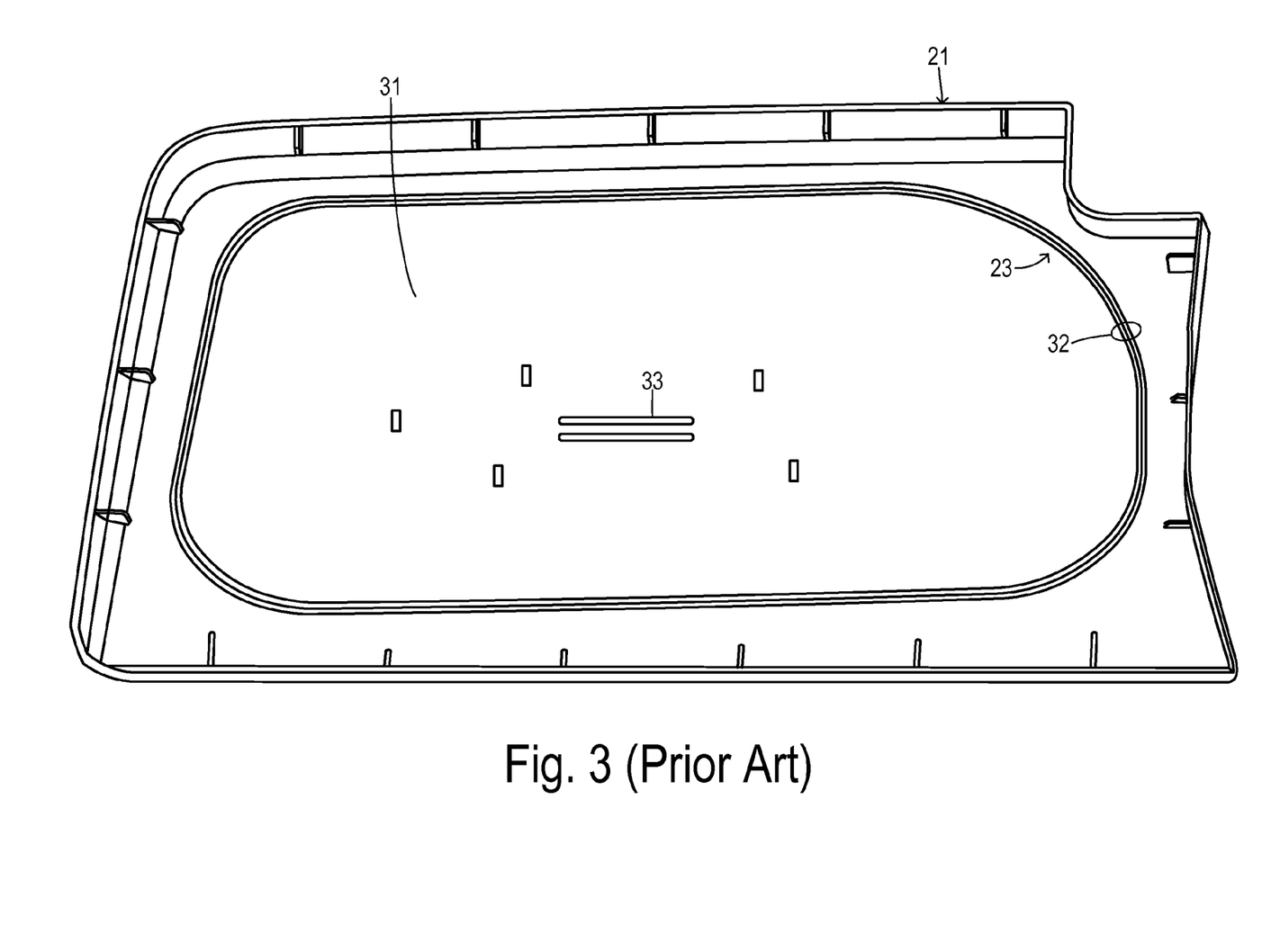
FIG. 3 is a perspective view of the prior art outer trim panel of FIG. 2 with the bladder wall removed.

FIG. 3 shows outer wall 21 with the inner bladder wall removed revealing a bladder surface 31 that faces the inner wall when assembled. A plurality of upstanding ribs 32 follow closed perimeter region 23 and are joined with flange 29 of inner bladder wall 22 (FIG. 2) by hot welding to create a hermetic seal for the inflatable bladder. Ribs 33 are provided for supporting the inflator.

Figure 4:
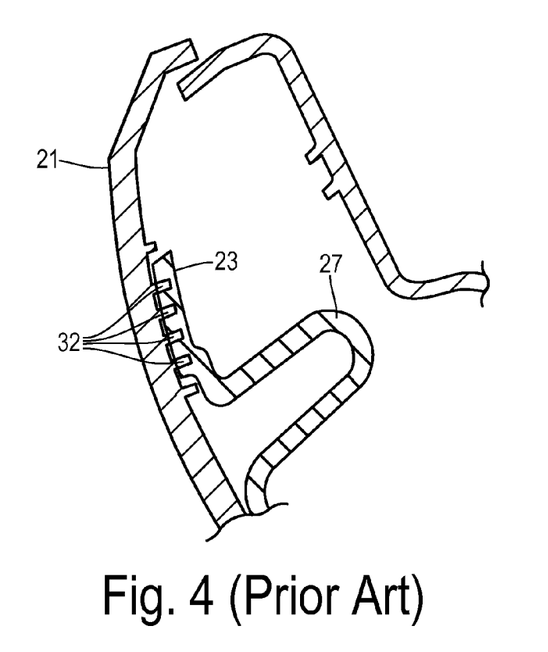
FIG. 4 is a cross-sectional view of a prior art welded joint between a trim panel and bladder wall.

FIG. 4 illustrates the welded joint between flange 23 and ribs 32 in greater detail. Due to the application of heat and pressure, ribs 32 preferably penetrate and bond with flange 23. During inflation, outer wall 21 moves outward while pleat 27 unfolds. Because the weld interface is perpendicular to the direction of the net force between outer wall 21 and bladder wall 22, the force tends to peel apart the weld.

In order to avoid certain disadvantages of the known welded joints, the present invention employs a two-shot injection molding process to bond the separately molded outer trim panel and expandable bladder member. Different but compatible materials can be used for the outer trim panel, bladder member, and an attachment body that is molded in-situ between the previously molded trim panel and bladder member. In the two-shot molding process, a more repeatable and capable bond can be obtained between the two separately molded parts as a result of a partial re-melting of the previously molded parts along the interface due to the heat of the injected material for the attachment body. Furthermore, the joint can be easily designed to orient the bonding interface such that deployment stress acts as a shear force rather than in peel, thereby increasing the ability to manage greater levels of internal pressure in the bolster.

Figure 5:
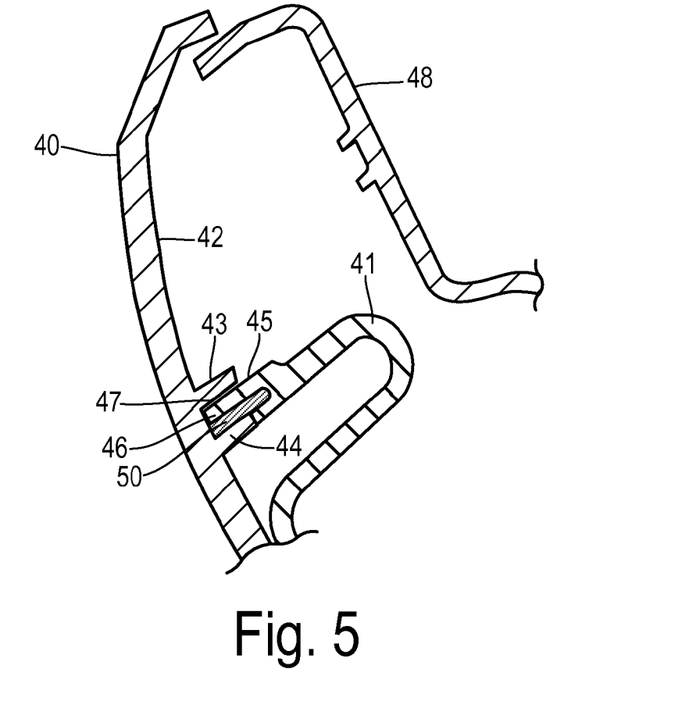
FIG. 5 is a cross-sectional view of a bonded joint according to one embodiment of the present invention having an attachment body molded in-situ between the trim panel and bladder wall.

A first embodiment is shown in FIG. 5 wherein the plastic-molded outer trim panel 40 is bonded to a plastic-molded expandable bladder member 41. A closed-loop bonding section on an inside surface 42 of trim panel 40 includes circumferential ribs 43 and 44. Bladder member 41 has a bonding flange 45 along its peripheral edge which is arranged to extend in a direction parallel with the direction of ribs 43 and 44. Bonding flange 45 has a distal end 46 received in the bottom of a groove 47 between ribs 43 and 44. Bonding flange 45 is comprised of a continuous sheet, radially-spaced from one side of circumferential rib 44 in order to define a substantially closed toroidal region between them. An attachment body 50 is molded in-situ in order to substantially fill the toroidal region. The side of rib 44 and bonding flange 45 define the toroidal region to extend generally perpendicularly with respect to inside surface 42. Thus, the bonding interfaces of attachment body 50 with both trim panel 40 and bladder member 41 are oriented in the shear direction to provide maximum bonding strength. More specifically, attachment body 50 has a cross section with a plate-like shape having a first major surface bonded to bonding flange 45 and a second major surface bonded to the side of rib 44. Numeral 48 represents a support wall for forming part of the reaction surface for the bolster which may be assembled after performing the two-shot molding process.

In order to conduct the two-shot molding process, trim panel 40 and bladder member 41 may preferably be placed into a fixture for registering them together in an orientation which creates the toroidal region. In order for molten plastic to enter the toroidal region, one or more entry and venting apertures (not shown) may be formed in either trim panel 40 or bladder member 41 at appropriate locations depending upon each particular design. The apertures become sealed off after formation of attachment body 50, thereby maintaining a sealed chamber between trim panel 40 and bladder member 41.

Figure 6:
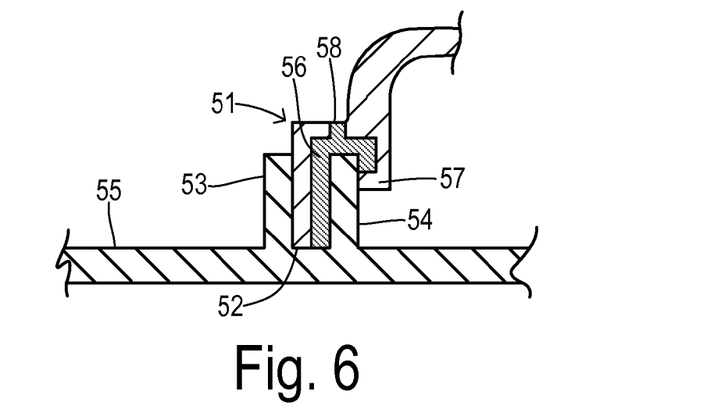
FIG. 6 is a cross-sectional view of another embodiment of a bonded joint.

Various shapes for the toroidal region can be obtained by manipulating the respective shapes of the bonding flange and the closed-loop bonding section. As shown in FIG. 6, bonding flange 51 may be shaped such that when its distal end 52 is inserted between a pair of circumferential ribs 53 and 54 on a trim panel 55, an L-shaped or J-shaped toroidal region is formed as a result of in-situ molding of attachment body 56. Bonding flange 51 has a heel 57 for abutting rib 54 so that attachment body 56 wraps around rib 54, thereby increasing the surface area of the bonding interface. Injection aperture 58 is provided on bonding flange 51 to provide a path for the molten plastic during in-situ molding.

Figure 7:
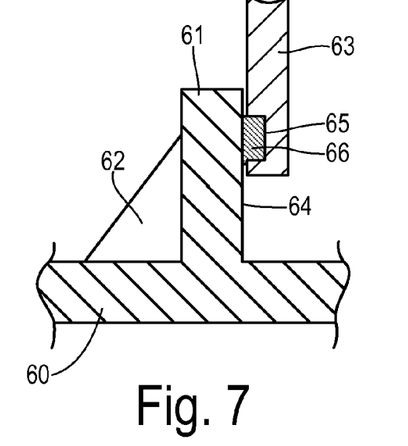
FIG. 7 is a cross-sectional view of another embodiment of a bonded joint.
Figure 8:
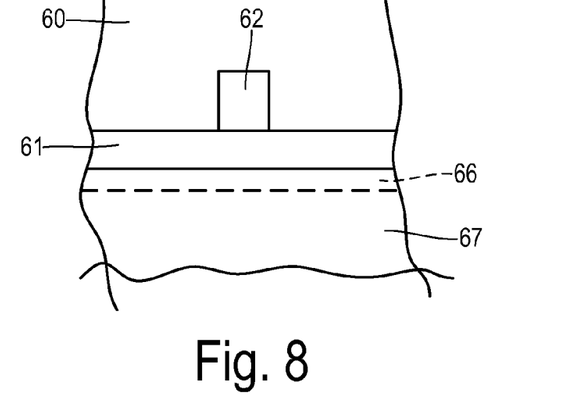
FIG. 8 is a plan view of the bonded joint of FIG. 7.

FIG. 7 shows an alternative embodiment wherein a single rib 61 extends from a trim panel 60. A cross-brace 62 may be provided at spaced locations around the periphery of rib 61 for added strength. A bonding flange 63 of the bladder member extends along an inner side surface 64 of rib 61. A cutout 65 in bonding flange 63 creates the closed toroidal region into which an attachment body 66 is in-situ molded. FIG. 8 is a top view showing trim panel 60 with brace 62 supporting rib 61. Bladder member 67 nests within rib 61 and attachment body 66 bonds the two together.

Figure 9:
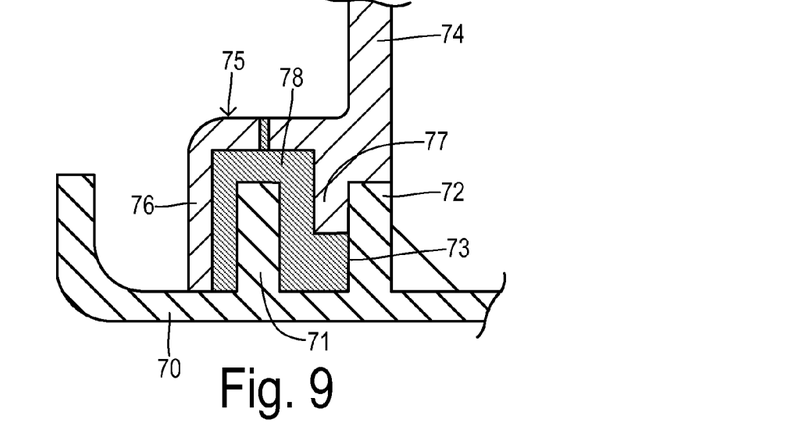
FIG. 9 is a cross-sectional view of another embodiment of a bonded joint.

FIG. 9 shows an alternative embodiment having a U-shaped or sinuous shape for increasing the surface area of the bonding interface. Thus, an outer trim panel 70 has a pair of ribs 71 and 72 defining an intermediate groove 73. A bladder member 74 has a bonding flange 75 with an outer leg 76 and an inner leg 77 which maintain a generally U-shaped toroidal space around rib 71 into which an attachment body 78 is injection molded in-situ to substantially fill the toroidal region. Leg 77 is truncated so that it does not reach the bottom of groove 73, thereby increasing the interface with leg 77 in the direction parallel with trim panel 70.

Figure 10:
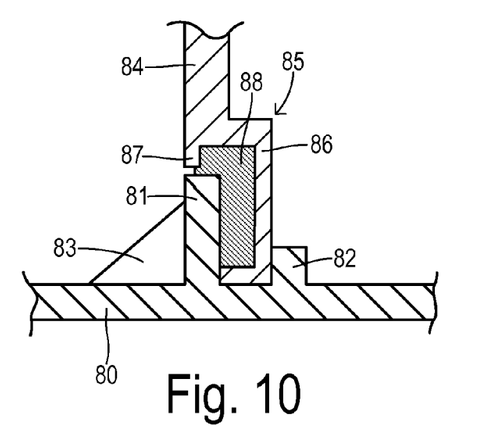
FIG. 10 is a cross-sectional view of another embodiment of a bonded joint.
Figure 11:
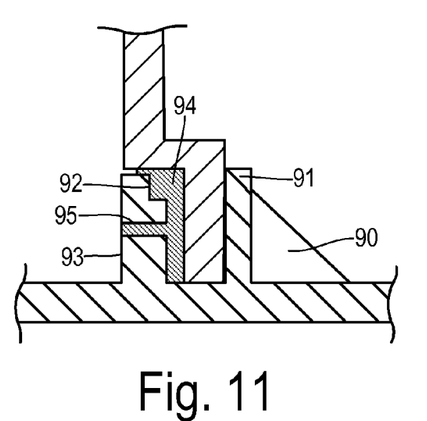
FIG. 11 is a cross-sectional view of another embodiment of a bonded joint.

Another embodiment in FIG. 10 has an outer trim panel 80 with a radially outward rib 81 and a radially inward truncated rib 82. Rib 81 is braced by a plurality of bracing bodies 83. A bladder member 84 has bonding flange 85 with a cup section 86 and a toe 87. The lower end of cup section 86 bears against trim panel 80 between ribs 81 and 82 providing a toroidal region between rib 81 and cup section 86 which is substantially filled by an attachment body 88 introduced in an in-situ two-shot molding process. A gap between toe 87 and rib 81 can be used to introduce the injected plastic for attachment body 88, for example. The embodiment of FIG. 11 is similar to that of FIG. 10, except that a bracing member 90 may be employed on a radially inward circumferential rib 91 and a cut-out 92 may be formed on outer circumferential rib 93 to increase the volume of attachment body 94. An aperture 95 is shown in cross section where molten plastic may be injected into the toroidal region.

Figure 12:
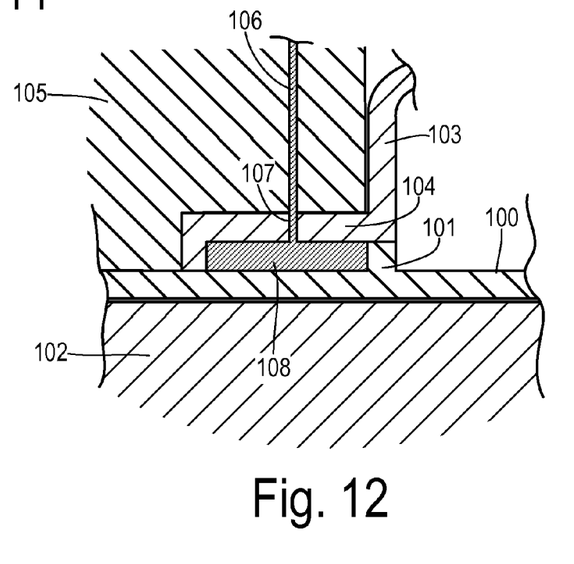
FIG. 12 is a cross-sectional view of another embodiment of a bonded joint during formation of the attachment body in a mold.

Since a bonding strength resulting from the two-shot molding process may be greater than conventional hot plate welding, the present invention can also attain improved results even with a bonding interface oriented in peel instead of in shear. As shown in FIG. 12, an outer trim panel 100 with a circumferential rib 101 is placed on a first fixture 102 of a press. A bladder member 103 having a bonding flange 104 is placed atop trim panel 100 and clamped in place by a second fixture 105 of the press. An injection line 106 passing through fixture 105 is aligned with an aperture 107 in bonding flange 104 so that molten plastic may be injected into a toroidal region 108 defined between trim panel 100, rib 101, and bonding flange 104.

Figure 13:
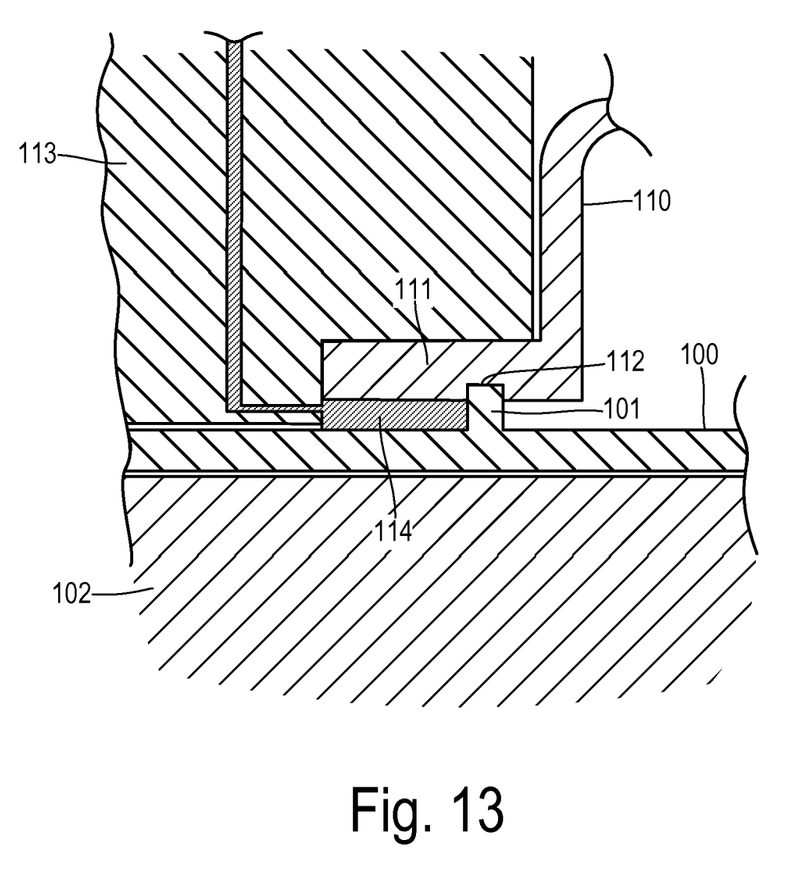
FIG. 13 is a cross-sectional view of another embodiment of a bonded joint during formation of the attachment body in a mold.

FIG. 13 shows a similar embodiment wherein a bladder member 110 includes a bonding flange 111 with a notch 112 for receiving rib 101. A fixture 113 may define an edge of the toroidal region into which attachment body 114 is formed.

What is claimed is:

1. An active bolster for providing an interior trim surface of an automotive vehicle, comprising:
   a plastic-molded outer trim panel having a closed-loop bonding section on an inside surface;
   a plastic-molded expandable bladder member having a central attachment section configured to attach to a support structure of the vehicle, a bonding flange along an peripheral edge, and a baffle section between the central attachment section and the bonding flange, wherein the closed-loop bonding section and the bonding flange are configured to define a substantially closed toroidal region therebetween;
   an attachment body injection molded in-situ to substantially fill the toroidal region; and
   an inflator for coupling an inflation gas into a space between the trim panel and bladder member to expand the bladder member in response to a crash event of the vehicle.

2. The active bolster of claim 1 wherein the closed-loop bonding section includes a circumferential rib projecting from the inside surface, and wherein at least one side of the circumferential rib extending perpendicularly from the inside surface provides an edge of the toroidal region.

3. The active bolster of claim 2 wherein the bonding flange is comprised of a continuous sheet radially spaced from the one side of the circumferential rib, wherein the attachment body has a first major surface bonded to the continuous sheet and a second major surface bonded to the one side of the circumferential rib.

4. The active bolster of claim 1 wherein the attachment body has an L-shaped cross-section.

5. The active bolster of claim 1 wherein the attachment body has a U-shaped cross-section.

6. The active bolster of claim 1 wherein the trim panel moves in a deployment direction during inflation, and wherein the attachment body has respective interfaces with the bonding flange and the closed-loop bonding section that are substantially parallel to the deployment direction.

7. An active bolster comprising:
   a trim panel having a closed-loop bonding section;
   a bladder member configured to attach to a vehicle and including a bonding flange along an peripheral edge and a baffle section radially inward of the bonding flange, wherein the closed-loop bonding section and the bonding flange are configured to define a substantially closed toroidal region therebetween; and
   an attachment body injection molded in-situ to substantially fill the toroidal region.

8. The active bolster of claim 7 wherein the closed-loop bonding section includes a circumferential rib projecting from an inside surface of the trim panel, and wherein at least one side of the circumferential rib extending perpendicularly from the inside surface provides an edge of the toroidal region.

9. The active bolster of claim 8 wherein the bonding flange is comprised of a continuous sheet radially spaced from the one side of the circumferential rib, wherein the attachment body has a first major surface bonded to the continuous sheet and a second major surface bonded to the one side of the circumferential rib.

10. The active bolster of claim 7 wherein the attachment body has an L-shaped cross-section.

11. The active bolster of claim 7 wherein the attachment body has a U-shaped cross-section.

12. An active bolster comprising:
   a trim panel having a closed-loop bonding section;
   a bladder member configured to attach to a vehicle and including a bonding flange along an peripheral edge and a baffle section radially inward of the bonding flange, wherein the closed-loop bonding section and the bonding flange are configured to define a substantially closed toroidal region therebetween; and
   an attachment body molded in-situ to substantially fill the toroidal region;
   wherein the trim panel moves in a deployment direction in response to an inflation gas released between the trim panel and the bladder member during an impact event, and wherein the attachment body has respective interfaces with the bonding flange and the closed-loop bonding section that are substantially parallel to the deployment direction.

13. The active bolster of claim 12 wherein the closed-loop bonding section includes a circumferential rib projecting from an inside surface of the trim panel, and wherein at least one side of the circumferential rib extending perpendicularly from the inside surface provides an edge of the toroidal region.

14. The active bolster of claim 13 wherein the bonding flange is comprised of a continuous sheet radially spaced from the one side of the circumferential rib, wherein the attachment body has a first major surface bonded to the continuous sheet and a second major surface bonded to the one side of the circumferential rib.

15. The active bolster of claim 12 wherein the attachment body has an L-shaped cross-section.

16. The active bolster of claim 12 wherein the attachment body has a U-shaped cross-section.

* * * * *